US012310375B2

(12) United States Patent
Burkhalter (10) Patent No.: US 12,310,375 B2
(45) Date of Patent: May 27, 2025

(54) FOOD PROCESSING APPARATUS AND CORRESPONDING FOOD PROCESSING METHOD (71) Applicant: Provisur Technologies, Inc., Chicago, IL (US)

(72) Inventor: Heinz Burkhalter, Wil (CH)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 189 days.

(21) Appl. No.: 17/442,802

(22) PCT Filed: Apr. 9, 2020

(86) PCT No.: PCT/EP2020/060159
§ 371 (c)(1),
(2) Date: Sep. 24, 2021

(87) PCT Pub. No.: WO2020/212246
PCT Pub. Date: Oct. 22, 2020

(65) Prior Publication Data
US 2022/0346390 A1 Nov. 3, 2022

(30) Foreign Application Priority Data

Apr. 18, 2019 (DE) .......................... 102019110313.4

(51) Int. Cl.
B30B 15/26 (2006.01)
A22C 7/00 (2006.01)
(Continued)

(52) U.S. Cl.
CPC ............ A22C 17/002 (2013.01); A22C 7/003 (2013.01); A22C 17/0073 (2013.01);
(Continued)

(58) Field of Classification Search
CPC ..... B30B 11/00; B30B 11/005; B30B 11/025; B30B 11/04; B30B 15/00; B30B 15/16;
(Continued)

(56) References Cited

U.S. PATENT DOCUMENTS 2,043,366 A 6/1932 Bech
2,241,807 A 5/1941 Cotner
(Continued)

FOREIGN PATENT DOCUMENTS

AU 200111314 A1 5/2001
AU 2012267912 B2 12/2012
(Continued)

OTHER PUBLICATIONS

Amendment dated Jan. 24, 2022 filed in EP Appln No. 20 718 654.3, 45 pages.
(Continued)

Primary Examiner — Jimmy T Nguyen
(74) Attorney, Agent, or Firm — Klintworth & Rozenblat IP LLP (57) ABSTRACT A food processing apparatus for processing food products, in particular meat products, includes a press for pressing the food products with specific pressing parameters and a control unit which is connected on its output side to the press and sets the pressing parameters. A first analyzing device for analyzing the food products before pressing and for generating corresponding first analysis parameters of the food products is provided. The first analysis parameters represent product properties of the analyzed food product. The control unit is connected to the first analyzing device and sets the pressing parameters depending on the first analysis parameters.

17 Claims, 5 Drawing Sheets (51) Int. Cl.
*A22C 17/00* (2006.01)
*B30B 15/34* (2006.01)

(52) U.S. Cl.
CPC .......... *A22C 17/0093* (2013.01); *B30B 15/26* (2013.01); *B30B 15/34* (2013.01)

(58) Field of Classification Search
CPC ....... B30B 15/26; B30B 15/34; A22C 17/002; A22C 17/0073; A22C 17/0093; A22C 7/00; A22C 7/003; A22C 7/0046; A22C 7/0061; A22C 7/0023; Y10S 100/91
See application file for complete search history.

(56) References Cited

U.S. PATENT DOCUMENTS

| | | | |
|---|---|---|---|
| 2,565,245 | A | 8/1951 | Lebovitz |
| 2,880,668 | A | 4/1959 | Cranke |
| 3,105,433 | A | 10/1963 | Yerex et al. |
| 3,179,039 | A | 4/1965 | Christensen |
| 3,211,086 | A | 10/1965 | Pearce |
| 3,229,621 | A | 1/1966 | Decker et al. |
| 3,285,162 | A | 11/1966 | Schneider et al. |
| 3,326,120 | A | 6/1967 | Schneider et al. |
| 3,327,622 | A | 6/1967 | Lebovitz |
| 3,633,245 | A | 1/1972 | Partos |
| 3,667,521 | A | 6/1972 | Beasley |
| 3,727,545 | A | 4/1973 | Madsen et al. |
| 3,753,398 | A | 8/1973 | Dohm, Jr. |
| 3,759,170 | A | 9/1973 | Bettcher |
| 3,842,260 | A | 10/1974 | Christensen et al. |
| 3,846,958 | A | 11/1974 | Divan |
| 3,901,140 | A | 8/1975 | Dohm, Jr. |
| 3,982,299 | A | 9/1976 | Kompan |
| 3,990,336 | A | 11/1976 | Soodalter |
| 4,147,485 | A | 4/1979 | Zimmerman |
| 4,273,789 | A | 6/1981 | Zimmerman |
| 4,557,019 | A | 12/1985 | Van Devanter et al. |
| 4,651,384 | A | 3/1987 | Korhonen |
| 4,962,568 | A | 10/1990 | Rudy et al. |
| 4,967,652 | A | 11/1990 | Mally |
| 5,064,667 | A | 11/1991 | Mally |
| 5,117,717 | A | 6/1992 | Mally |
| 5,267,168 | A | 11/1993 | Antonissen et al. |
| 5,314,375 | A | 5/1994 | O'Brien et al. |
| 5,324,228 | A | 6/1994 | Vogeley, Jr. |
| 5,334,084 | A | 8/1994 | O'Brien et al. |
| 5,429,548 | A | 7/1995 | Long et al. |
| 5,431,935 | A | 7/1995 | Carey |
| 5,470,274 | A | 11/1995 | Kadi et al. |
| 5,482,166 | A | 6/1996 | Brown |
| 5,568,766 | A | 10/1996 | Otremba et al. |
| 5,638,748 | A | 6/1997 | Daniel |
| 5,668,634 | A | 9/1997 | Newman |
| 5,682,742 | A | 11/1997 | Sato et al. |
| 5,701,811 | A | 12/1997 | Kawakami |
| 5,727,997 | A | 3/1998 | Dufour et al. |
| 5,902,177 | A | 5/1999 | Tessier et al. |
| 5,913,956 | A | 6/1999 | Capps |
| 5,944,598 | A | 8/1999 | Tong et al. |
| 5,979,210 | A | 11/1999 | Baur et al. |
| 6,089,849 | A | 7/2000 | Bulgrin et al. |
| 6,108,587 | A | 8/2000 | Shearer et al. |
| 6,129,625 | A | 10/2000 | Cate et al. |
| 6,156,358 | A | 12/2000 | Soper |
| 6,186,059 | B1 | 2/2001 | Mello et al. |
| 6,189,059 | B1 | 2/2001 | Sotek et al. |
| 6,198,834 | B1 | 3/2001 | Belk et al. |
| 6,449,334 | B1 * | 9/2002 | Mazess ................ G01N 23/083 378/53 |
| 6,511,370 | B1 | 1/2003 | Mello et al. |
| 6,530,311 | B1 | 3/2003 | Wilkens et al. |
| 6,601,499 | B1 | 8/2003 | Bifulco |
| 6,604,991 | B1 | 8/2003 | Jurs et al. |
| 6,692,345 | B1 | 2/2004 | Kruger |
| 6,859,282 | B1 | 2/2005 | Weber et al. |
| 6,860,804 | B2 | 3/2005 | Kruger |
| 6,882,434 | B1 | 4/2005 | Sandberg et al. |
| 6,941,783 | B2 | 9/2005 | Yamanaka et al. |
| 7,052,388 | B2 | 5/2006 | Houtz |
| 7,156,730 | B1 | 1/2007 | Blaine |
| 7,251,537 | B1 | 7/2007 | Blaine et al. |
| 7,364,504 | B2 | 4/2008 | Gasbarro |
| 7,373,217 | B2 | 5/2008 | Young |
| 7,399,220 | B2 | 7/2008 | Kriesel et al. |
| 7,450,247 | B2 | 11/2008 | Sandberg et al. |
| 7,452,266 | B2 | 11/2008 | Bottemiller |
| 7,481,158 | B2 | 1/2009 | Gerngross et al. |
| 7,500,550 | B2 | 3/2009 | Strong et al. |
| 7,501,140 | B2 | 3/2009 | Gould et al. |
| 7,578,732 | B2 | 8/2009 | Lennox, III |
| 7,621,806 | B2 | 11/2009 | Bottemiller et al. |
| 7,623,249 | B2 | 11/2009 | Sandberg et al. |
| 7,651,388 | B2 | 1/2010 | Faires et al. |
| 7,687,093 | B2 | 3/2010 | Nielsen |
| 7,715,935 | B2 | 5/2010 | Vogeley, Jr. et al. |
| 7,747,042 | B2 | 6/2010 | Blaine |
| 7,841,264 | B2 | 11/2010 | Kim et al. |
| 7,891,264 | B2 | 2/2011 | Wada |
| 7,918,718 | B2 | 4/2011 | Christensen et al. |
| 7,949,414 | B2 | 5/2011 | Blaine et al. |
| 8,016,649 | B2 | 9/2011 | Schimitzek |
| 8,025,000 | B2 | 9/2011 | Kim et al. |
| 8,116,554 | B2 | 2/2012 | Burton |
| 8,166,856 | B2 | 5/2012 | Kim et al. |
| 8,373,749 | B2 | 2/2013 | Burton |
| 8,517,806 | B2 | 8/2013 | Fillenworth et al. |
| 8,529,321 | B2 | 9/2013 | Weber |
| 8,643,851 | B2 | 2/2014 | Weber |
| 8,688,267 | B2 | 4/2014 | Blaine et al. |
| 8,721,405 | B2 | 5/2014 | McKenna et al. |
| 8,758,099 | B2 | 6/2014 | Reifenhaeuser |
| 8,962,055 | B2 | 2/2015 | Groneberg-Nienstedt |
| 8,968,808 | B1 | 3/2015 | Kunert et al. |
| 8,986,080 | B2 | 3/2015 | Black et al. |
| 9,091,673 | B2 | 7/2015 | Fern et al. |
| 9,095,147 | B2 | 8/2015 | Hjalmarsson et al. |
| 9,198,442 | B2 | 12/2015 | Peters et al. |
| 9,247,755 | B1 | 2/2016 | Andre et al. |
| 9,285,213 | B2 | 3/2016 | Lindee et al. |
| 9,351,498 | B2 | 5/2016 | Grimm et al. |
| 9,386,780 | B2 | 7/2016 | Soncimi |
| 9,526,257 | B1 | 12/2016 | Farrant et al. |
| 9,538,768 | B2 | 1/2017 | Dunivan |
| 9,700,060 | B2 | 7/2017 | Inoue et al. |
| 9,770,838 | B2 | 9/2017 | Kim et al. |
| 9,778,651 | B2 | 10/2017 | Strong et al. |
| 9,888,696 | B2 | 2/2018 | Lindee et al. |
| 9,913,483 | B2 | 3/2018 | Vuholm et al. |
| 10,040,213 | B2 | 8/2018 | Nielsen |
| 10,863,751 | B2 | 12/2020 | Blaine |
| 10,869,489 | B2 | 12/2020 | Blaine et al. |
| 2001/0036807 | A1 | 11/2001 | Veldkamp et al. |
| 2002/0004366 | A1 | 1/2002 | Thorvaldsson et al. |
| 2004/0029514 | A1 | 2/2004 | Kruger |
| 2004/0200365 | A1 | 10/2004 | Young |
| 2005/0032471 | A1 | 2/2005 | Pfarr et al. |
| 2005/0085176 | A1 | 4/2005 | Houtz |
| 2005/0199111 | A1 | 9/2005 | Sandberg et al. |
| 2006/0154587 | A1 | 7/2006 | Mikkelsen et al. |
| 2006/0156878 | A1 | 7/2006 | Faires et al. |
| 2006/0162515 | A1 | 7/2006 | Vogeley, Jr. et al. |
| 2006/0171581 | A1 | 8/2006 | Blaine |
| 2006/0205335 | A1 | 9/2006 | Bifulco |
| 2007/0202229 | A1 | 8/2007 | Nielsen |
| 2008/0196566 | A1 | 8/2008 | Culling |
| 2008/0200107 | A1 | 8/2008 | Christensen et al. |
| 2008/0212842 | A1 | 9/2008 | Burton |
| 2008/0281461 | A1 | 11/2008 | Blaine et al. |
| 2009/0035434 | A1 | 2/2009 | Sverrisson et al. |
| 2009/0038455 | A1 | 2/2009 | Strong et al. |
| 2009/0064833 | A1 | 3/2009 | Sandberg et al. |
| 2009/0137195 | A1 | 5/2009 | Bottemiller et al. |
| 2009/0246333 | A1 | 10/2009 | Groneberg-Nienstedt et al. |

(56) References Cited

U.S. PATENT DOCUMENTS

| | | |
|---|---|---|
| 2010/0066824 A1 | 3/2010 | Burton |
| 2010/0179684 A1 | 7/2010 | Blaine et al. |
| 2010/0267320 A1 | 10/2010 | Weber |
| 2010/0304652 A1 | 12/2010 | Bolte et al. |
| 2011/0111682 A1 | 5/2011 | Schimitzek |
| 2011/0154969 A1 | 6/2011 | Weber |
| 2012/0018353 A1 | 1/2012 | McKenna et al. |
| 2012/0040597 A1 | 2/2012 | Fern et al. |
| 2012/0115406 A1 | 5/2012 | Fillenworth et al. |
| 2012/0212603 A1 | 8/2012 | Lindee et al. |
| 2013/0260660 A1 | 10/2013 | Reifenhaeuser |
| 2014/0220193 A1 | 8/2014 | Hocker et al. |
| 2015/0093488 A1 | 4/2015 | Gutmann et al. |
| 2015/0150272 A1 | 6/2015 | Peters et al. |
| 2015/0205288 A1 | 7/2015 | Strong et al. |
| 2015/0216192 A1 | 8/2015 | Jacobsen et al. |
| 2016/0088852 A1 | 3/2016 | Lindee et al. |
| 2017/0035066 A1 | 2/2017 | Hukelmann |
| 2017/0156354 A1 | 6/2017 | Inoue et al. |
| 2017/0210023 A1 | 7/2017 | Hocker et al. |
| 2017/0212506 A1 | 7/2017 | Pfarr et al. |
| 2017/0217044 A1 | 8/2017 | Blaine |
| 2017/0245509 A1 | 8/2017 | Petersen et al. |
| 2018/0027848 A1 | 2/2018 | Blaine et al. |
| 2018/0029246 A1 | 2/2018 | Blaine et al. |
| 2018/0158537 A1 | 6/2018 | Blaine |
| 2019/0009421 A1 | 1/2019 | Grasselli |
| 2019/0281843 A1 | 9/2019 | Volkl et al. |
| 2020/0068908 A1 | 3/2020 | Blaine |
| 2020/0068909 A1 | 3/2020 | Blaine et al. |
| 2021/0227840 A1 | 7/2021 | Blaine |

FOREIGN PATENT DOCUMENTS

| | | | |
|---|---|---|---|
| AU | 2013202066 A1 | 10/2013 | |
| AU | 2013301673 B2 | 2/2014 | |
| CA | 2531857 A1 | 6/2006 | |
| CA | 2550972 A1 | 12/2006 | |
| CA | 2877448 C | 10/2016 | |
| CA | 2904958 A1 | 3/2017 | |
| CN | 105979784 A | 9/2016 | |
| DE | 2843388 A1 | 6/1979 | |
| DE | 8128596 U1 | 3/1982 | |
| DE | 3100901 A1 | 8/1982 | |
| DE | 3128596 A1 | 1/1983 | |
| DE | 3128596 S2 | 1/1983 | |
| DE | 4106689 A1 | 10/1991 | |
| DE | 68903375 T2 | 3/1993 | |
| DE | 10220006 A1 | 11/2003 | |
| DE | 102004010696 A1 | 9/2005 | |
| DE | 60305523 T2 | 8/2007 | |
| DE | 102010021951 A1 | 12/2011 | |
| DE | 102012107278 A1 | 2/2014 | |
| DE | 10220006 B4 * | 4/2015 | ........... A22C 7/0023 |
| DE | 102019110313 B3 | 7/2020 | |
| DK | 201570224 A1 | 4/2015 | |
| EP | 0101264 A2 | 2/1984 | |
| EP | 0057478 B1 | 4/1986 | |
| EP | 0373844 A1 | 6/1990 | |
| EP | 1174034 A1 | 1/2002 | |
| EP | 1211944 B1 | 9/2004 | |
| EP | 1555882 B1 | 5/2006 | |
| EP | 1289374 B1 | 7/2007 | |
| EP | 1782929 A2 | 9/2007 | |
| EP | 2084968 A1 | 5/2009 | |
| EP | 1781110 B1 | 2/2010 | |
| EP | 2210495 A1 | 7/2010 | |
| EP | 2341313 A1 | 7/2011 | |
| EP | 2353391 A1 | 8/2011 | |
| EP | 2353395 A1 | 8/2011 | |
| EP | 2625959 A2 | 8/2013 | |
| EP | 2531038 B1 | 12/2013 | |
| EP | 2644337 B1 | 3/2014 | |
| EP | 2755018 A1 | 7/2014 | |
| EP | 2308313 B1 | 3/2016 | |
| EP | 3069835 A1 | 9/2016 | |
| EP | 3275313 A1 | 1/2018 | |
| EP | 2882296 B1 | 4/2018 | |
| EP | 3424332 A1 | 1/2019 | |
| GB | 2075459 A | 11/1981 | |
| GB | 2364894 A8 | 2/2002 | |
| GB | 2377362 A | 1/2003 | |
| JP | 2007522948 A | 8/2007 | |
| JP | 5025271 B2 | 9/2012 | |
| MX | 2017003541 A | 10/2017 | |
| WO | 90/03736 A1 | 4/1990 | |
| WO | WO1990015005 A1 | 12/1990 | |
| WO | 2004/106020 A1 | 12/2004 | |
| WO | 2006080033 A1 | 8/2006 | |
| WO | 2007/022782 A2 | 3/2007 | |
| WO | 2007096363 A1 | 8/2007 | |
| WO | WO2008095500 A2 | 8/2008 | |
| WO | WO2011095998 A1 | 8/2011 | |
| WO | 2012161577 A1 | 11/2012 | |
| WO | 2013135264 A1 | 9/2013 | |
| WO | 2013148322 A1 | 10/2013 | |
| WO | 2014/023626 A2 | 2/2014 | |
| WO | 2015/092935 A1 | 6/2015 | |
| WO | 2015114118 A1 | 8/2015 | |
| WO | 2015/193507 A1 | 12/2015 | |
| WO | WO2016023557 A1 | 2/2016 | |
| WO | 2016/045683 A1 | 3/2016 | |
| WO | WO2016202508 A1 | 12/2016 | |
| WO | WO2017066549 A1 | 4/2017 | |
| WO | 2018111108 A2 | 6/2018 | |
| WO | 2020212246 A1 | 10/2020 | |

OTHER PUBLICATIONS

Opponent Response to Objection dated Feb. 26, 2024 filed in Opposition of German Patent No. 10 2019 110 313, 93 pages.
Official Action dated Mar. 1, 2024, received in Opposition Proceeding to German Patent No. 10 2019 110 313.4, 110 pages.
Patent holder Response dated Jun. 20, 2024 submitted in response to Official Communication dated Mar. 1, 2024 to German Patent No. 10 2019 110 313, 156 pages.
Machine translation of DE 10220006 A1.
International Search Report and Written Opinion from International Patent Application No. PCT/EP2020/060159 dated Jun. 29, 2020, 15 pages.
English Machine Translation of CN 105979784 A.
English Machine Translation of DE 102004010696 A1.
English Machine Translation of DE 102010021951 A1.
English Machine Translation of DE 102012107278 A1.
English Machine Translation of DE 60305523 T2.
English Machine Translation of EP 2341313 A1.
English Machine Translation of EP 3275313 A1.
English Machine Translation of JP 2007522948 A.
English Machine Translation of JP 5025271 B2.
English Machine Translation of MX 2017003541 A.
English machine translation of the abstract for DK 201570224 A1.
English Machine Translation of EP 2644337 B1.
English Machine Translation of WO 2015092935 A1.
"Hoegger, Operating the Machine."
"Hoegger, Machine Description, Applies to 174578, 205944, 207841."
Meyn Food Processing Technology B.V. "Performance software for poultry processing", revision date Jun. 13, 2018.
Meyn Poultry Processing Solutions, Wall-To-Wall Solutions, © Jan. 2013.
Machine translation for DE2843388A1.
Machine translation for DE3100901A1.
Machine translation for DE8128596U1.
Winopal et al., "Instrumentelle Sensorik in der Ernahrungswirtschaft", Teil 2: Mechanische Texturanalyse bei Lebensmitteln, DLG-Expertenwissen, dated Mar. 2015, 8 pages.
Auszugskopie aus "Lexikon der Physik" (1 Blatt), https://www.spektrum.de/lexikon/physik/scanner-optischer/12758, Copyright 1998, 2 pages.

(56) References Cited

OTHER PUBLICATIONS

Official Action dated May 10, 2021, received in Opposition Proceeding to German Patent Application No. 10 2019 110 313.4, 1,390 pages.
Opponent Response to Objection dated Oct. 17, 2023 submitted in Response to Objection in Opposition of German Patent No. 10 2019 110 313, 93 pages.
Official Action dated May 31, 2023 received in Opposition Proceeding to German Patent Application No. 10 2019 110 313.4, 26 pages.
Patent holder Response to Objection dated Oct. 2, 2023 submitted in Response to Objection dated May 31, 2023 to German Patent No. 10 2019 110 313, 146 pages.
Patent holder Response to Objection dated Jul. 29, 2021 submitted in Response to Objection dated May 10, 2021 to German Patent No. 10 2019 110 313, 34 pages.
BT-Hydraulik AG, Hydraulikaggregat 22 kW, IP320.04 mit "Dynamisch Pressen," Jan. 6, 2014.
Electrical Schematic, IP320& B321x, Hoeggger AG, Mar. 13, 2019.
Hoegger, Pneumatik IP320, Art-Nr, 152367, Mar. 30, 2015.
Opponent Response to Objection dated Nov. 4, 2024 filed in Opposition of German Patent No. 10 2019 110 313, 36 pages.

* cited by examiner

FOOD PROCESSING APPARATUS AND CORRESPONDING FOOD PROCESSING METHOD

This application is a 35 U.S.C. 371 application based upon PCT/EP2020/060159 filed on Apr. 9, 2020, the contents of which are incorporated herein by reference.

BACKGROUND OF THE INVENTION

The invention concerns a food processing apparatus and a corresponding food processing method for processing food products, such as meat products.

In industrial meat production, pieces of meat from a cutting plant are cut into portions and then packaged. Furthermore, it is known from the state of the art that the pieces of meat are pressed before cutting, which significantly enhances the subsequent cutting and packaging. For example, pressing the usually irregularly shaped pieces of meat from the cutting plant results in a regular product shape, which can be block-shaped, for example. This considerably reduces cutting losses due to cuts and end cuts during the subsequent slicing process. Pressing the pieces of meat before slicing thus increases the product yield during slicing. In addition, cutting portions to a predefined weight, creating a desired portion size and presenting them in the package is improved by pressing.

A problem with this well-known pressing is the fact that the pieces of meat from the cutting plant vary greatly in shape, size, weight and composition (flesh, fat, bone, gristle). The range of variation of the pieces of meat arriving from the cutting plant must therefore be taken into account when pressing the pieces of meat. The so-called dynamic pressing is known from the state of the art. The pieces of meat are pressed in a pressing chamber in three pressing axes, whereby the pressing process can be adjusted with regard to the pressing force, the pressing speed, the pressing travel and the pressing travel profile (pressing travel-time characteristic) in order to achieve an optimum pressing result. During pressing in particular, the longitudinal and vertical axes communicate via the meat product in terms of pressure. The vertical axis adapts its pressing travel profile to the pressure and expansion of the meat product. Usually, certain pressing parameters for a product category (e.g. raw ham) are optimized and then maintained during the subsequent pressing of the products of this product category.

However, the problem with this well-known dynamic press is the fact that meat products in the same product category also have a considerable variation in shape, size, weight and composition (flesh, fat, bone, gristle), whereas meat products in the same product category are pressed with constant pressing parameters. If, for example, a meat product is particularly large, pressing with the specified pressing parameters can lead to the breaking of bones in the meat product, which is undesirable.

Finally, reference is made to U.S. Pat. No. 8,166,856 B2 and DE 102 20 006 A1 regarding the technological background of the invention.

SUMMARY OF THE INVENTION

The invention is therefore based on the task of achieving better results when pressing food products (e.g. meat products) in industrial food production.

This task is solved by a food processing apparatus in accordance with the invention or by a food processing method in accordance with the invention in accordance with the independent claims.

The food processing apparatus according to the invention initially has a press in accordance with the state of the art to press food products with certain pressing parameters (e.g. pressing force, pressing travel, pressing travel profiles).

In addition, the food processing apparatus according to the invention has a control unit which is connected to the press on the output side and sets the pressing parameters of the press so that the pressing process is carried out in accordance with the specified pressing parameters.

The food processing apparatus according to the invention is characterized by a first analyzing device (e.g. scanner), which analyzes the food product before pressing and generates corresponding first analysis parameters, whereby the first analysis parameters reflect product properties of the analyzed food product.

The control unit is connected on the input side with the first analyzing device and receives the first analysis parameters, while the control unit sets the pressing parameters depending on the first analysis parameters.

In a preferred embodiment of the invention, the control unit can set the maximum pressing force with which the respective food product is pressed as the pressing parameter. The maximum pressing force can be set in a single pressing axis. Preferably, however, the maximum pressing force is specified in three pressing axes which are aligned transversely to each other, in particular at right angles to each other. However, it is also possible within the scope of the invention that the press has a rotary mechanism so that the various pressing axes are not perpendicular to each other.

Furthermore, within the scope of the invention, it is possible for the control unit to set the pressing travel in at least one pressing axis as a pressing parameter. The term "pressing travel" or "forming travel" does not refer to the pressing travel of press jaws. Rather, the term pressing travel in the context of the invention refers to the pressing travel performed by the pressed food product itself. Here, too, the pressing travel can be specified in a single pressing axis. Preferably, however, the pressing travel is specified in three pressing axes which are aligned transversely to each other, in particular at right angles to each other.

The invention also offers the possibility of setting the pressing time as the pressing parameter, i.e. the duration of a pressing process. For example, with a low degree of forming, the pressing time may be very short, i.e. the pressing process takes place very quickly, which enables a high product throughput. With a high degree of forming, on the other hand, it may be necessary to press relatively slowly, i.e. with a long pressing time. This reduces the product throughput, but prevents the food product from being damaged, e.g. by breaking the product or breaking a bone in the food product.

Furthermore, the invention also offers the possibility of massaging the food products during pressing. It is also possible to press in stages.

In addition, the invention also offers the possibility of specifying a pressing force-time curve as a pressing parameter, which shows the course of the pressing force as a function of the pressing time in at least one pressing axis. Here, too, it is possible that the pressing force-time curve is only specified in a single pressing axis. Preferably, however, the pressing force-time curve is specified in three pressing axes which are aligned transversely to each other, in particular at right angles to each other.

For example, the press result can also be improved by setting a comprehensive behavior model of the pressing axes and not a fixed profile, e.g. that the height gives way to a certain behavior when pressing with the length. Furthermore, certain food products are massaged with force. This allows considerable improvements to be achieved in the shaping of the product.

In addition, it is also possible for the control unit to set a pressing travel-time curve as a pressing parameter, which shows the course of the pressing travel in relation to the pressing time in at least one pressing axis. Here, too, it is preferably intended that the pressing travel-time curve is specified in three pressing axes which are aligned transversely to each other, in particular at right angles to each other.

In a preferred embodiment of the invention, the control unit determines an actual shape of the food products from the first analysis parameters before pressing. In addition, the control unit receives a desired target shape of the food products as input information, whereby the desired target shape can be specified, for example, by a downstream slicing device or by a downstream packaging device. The control unit then preferably determines from the specified target shape and from the determined actual shape of the respective food product the degree of deformation required to press the food product from the actual shape into the desired target shape. It has already been briefly mentioned above that with a high degree of deformation there is a risk that the food product will be damaged, for example by a bone fracture in the food product. The control unit can prevent such damage to the food product by adjusting the pressing parameters depending on the degree of deformation required. For example, the pressing time can be extended and the pressing speed reduced if a high degree of deformation is required, as the risk of damage to the pressed food product is lower with slow pressing.

In the preferred embodiment of the invention, the pressed products are analyzed not only before pressing, but also after pressing. For this purpose, a second analyzing device (e.g. scanner) is preferably provided, which analyzes the food products after pressing and generates corresponding second analysis parameters, which reproduce the product characteristics of the pressed food product. The control unit then sets the pressing parameter preferably not only depending on the analysis before pressing, but also depending on the analysis after pressing.

In the post-press analysis, the control unit can also detect whether the pressed food product has broken during the pressing process by analyzing the second analysis parameters, for example with a complete splitting of the food product or with a bone fracture in the food product. If such a fracture is detected, the control unit will preferably adjust the pressing parameters so that food products of the same product type are not subsequently fractured.

The first or second analyzing device is preferably a scanner, in particular an optical scanner or an X-ray scanner, which scans the food products and determines at least one of the following product characteristics:

Length of the food product,
Width of the food product,
Height of the food product,
Volume of the food product,
Form of the food product,
Fat content of the food product,
Bone content of the food product,
Lean meat content of the food product and/or
Bone volume of the food product,
Bone form of the food product,
Presence of a brow of the food product.

Such scanners are known from the state of the art and therefore do not need to be described in detail.

In addition, the first or second analyzing device may have a temperature measuring device which measures the temperature of the food products as a product characteristic. For example, this temperature measurement can be carried out using a thermal imaging camera.

Furthermore, the first or second analyzing device or the control unit can carry out a forcedisplacement measurement to determine the product strength, whereby the modulus of elasticity or the hardness of the food product is measured. For example, the freezing point of meat can vary considerably due to the different salt content of the meat product. However, the freezing point is the decisive factor during pressing, as the forming process is only maintained in this temperature range or below.

Further, the pressing parameters can be fed back from the press to the control unit, which then derives other product parameters from the pressing parameters. For example, the percentage of the frozen part of the product, the percentage of the unfrozen part of the product or the viscosity of the product can be derived from the measured pressing parameters.

For the sake of completeness, it should be mentioned that the food processing apparatus according to the invention preferably also has a slicing device to cut the pressed food products after pressing. Such slicing devices are known from the state of the art and are also referred to as "slicers".

In addition, the food processing apparatus according to the invention may also include a packaging device for packaging the pressed and sliced food products. For example, the food products can be placed in trays. For example, the packaging device can be a so-called thermoformer, as it is known from the state of the art.

Furthermore, the food processing apparatus according to the invention preferably also includes a conveyor (e.g. conveyor belt) to convey the food products along a conveyor path. Preferably, the conveyor path conveys the food products successively through the first analyzing device, through the press, through the second analyzing device, through the slicing device and finally into the packaging device.

In a preferred embodiment of the invention, the press comprises a press chamber in which the products are pressed by movable dies. Here, the scanning chamber has an adjustable degree of opening for receiving products of different sizes. For receiving a large product, the pressing chamber is opened relatively wide and for receiving a small product, the scanning chamber is opened relatively little. Further, the first analyzing device is preferably a scanner (e.g. optical scanner, X-ray scanner) which determines the size of the incoming products. Therefore, the first analysis parameters provided by the scanner reflect the size of the incoming products. The control unit then adjusts the opening degree of the pressing chamber according to the size of the product to be pressed. On the hand, an unnecessary wide opening of the pressing chamber is avoided in this way. This allows a reduction of the cycle time, i.e. the number of products pressed per time unit. On the other hand, the adjustment of the opening degree makes sure that products of different sizes can be pressed in the pressing chamber.

In addition to the food processing apparatus according to the invention described above, the invention also claims protection for a corresponding food processing method. The individual process steps of the food processing method according to the invention already result from the above description, so that a separate description of the individual steps can be dispensed with at this point.

BRIEF DESCRIPTION OF THE DRAWINGS

Other beneficial further modifications of the invention are explained in more detail below together with the description of the preferred embodiment of the invention on the basis of the figures. They show.

DETAILED DESCRIPTION OF THE DRAWINGS

Figure 1:
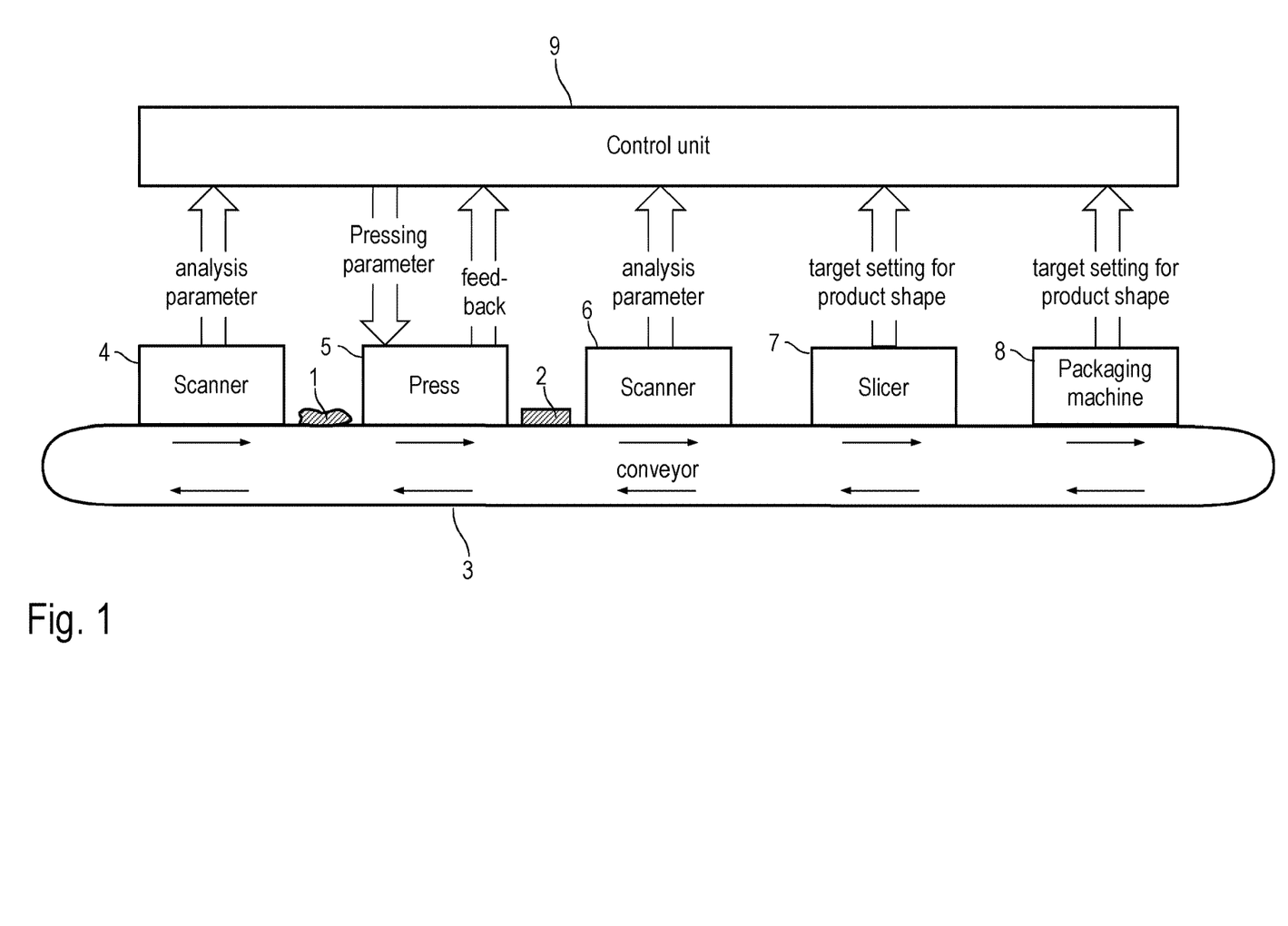
FIG. 1 shows a schematic representation of a food processing apparatus according to the invention.

FIG. 1 shows a schematic representation of a food processing apparatus according to the invention for pressing, cutting and packaging food products, where a food product 1 is shown before pressing and a food product 2 is shown after pressing.

The food products 1, 2 are conveyed by a conveyor 3 in the direction of the arrow through the food processing apparatus, first through an optical scanner 4, through a press 5, through another optical scanner 6, through a slicing device 7 ("slicer") and finally into a packaging machine 8, which packs the pressed and sliced food products 2 in trays. For this purpose, the packaging machine 8 can, for example, be designed as a thermoformer.

The optical scanner 4 optically scans the unpressed food products 1 before pressing and thus determines, for example, length, width, height, volume, shape, fat content, bone content, lean meat content and bone volume of the unpressed food products 1. The scanner 4 then outputs the corresponding analysis parameters to a control unit 9, whereby the control unit 9 controls the press 5 with the corresponding pressing parameters, as described in detail below. For example, the control unit 9 controls the degree of opening of the press 5, which will be explained later in detail with reference to FIGS. 4A and 4B.

The scanner 6 optically scans the pressed food products 2 after pressing and also transmits corresponding analysis parameters to the control unit so that the control unit 9 can adjust the pressing parameters accordingly, as described in detail below.

The slicing device 7 then cuts the pressed food products 2 into slices and forwards the sliced stacks to the downstream packaging machine 8, which then packs the sliced food products 2.

It should be noted that both the cutting unit 7 and the packaging machine 8 pass on targets for the optimum product shape to the control unit 9. Packaging in trays with a certain tray size usually requires a certain product shape that is optimally suited.

In addition, the cutter 7 also has a preferred product shape, which is passed on to the control unit 9 so that the control unit 9 can optimise the pressing parameters accordingly.

Figure 2:
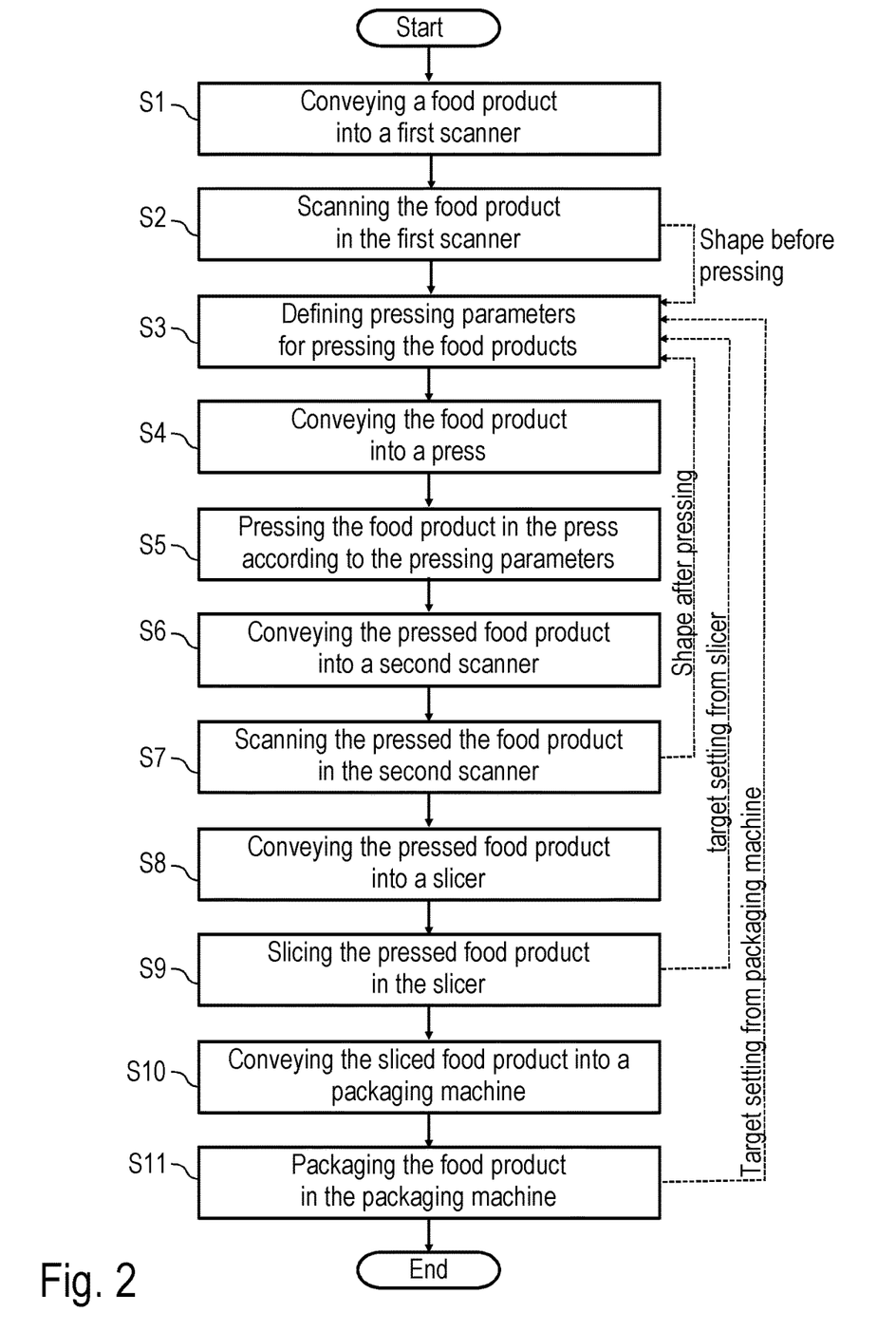
FIG. 2 shows a flow chart to illustrate the food processing method according to the invention.

In the following, the flow diagram shown in FIG. 2 is used to describe the food processing method according to the invention that can be carried out by the food processing apparatus as shown in FIG. 1.

In a first step S1, the conveyor 3 feeds the unpressed food products 1 into the scanner 4.

In the scanner 4, the unpressed food products 1 are then scanned in a step S2, generating corresponding analysis parameters.

In a step S3, pressing parameters are determined that are to be used to press the food product 1.

On the one hand, the analysis parameters previously determined by the scanner 4 are taken into account. This includes, for example, the product shape of the food products 1 before pressing. The pressing parameters also include the required degree of opening of the pressing chamber 13 of the press 5. For receiving a large product, the pressing chamber 13 is opened relatively wide and for receiving a small product, the scanning chamber 13 is opened relatively little.

On the other hand, when determining the pressing parameters in step S3, the shape of the food products 2 after pressing is also taken into account, whereby this product shape is determined in step S7 by the second scanner 6.

In addition, when determining the pressing parameters in step S3, the targets set by the slicing device 7 and the packaging machine 8 are also taken into account.

In a step S4, the food product 1 is then conveyed into the press 5.

In a step S5, the food product 1 is then pressed in the press 5 with the specified pressing parameters.

During the pressing process, the control unit 9 receives a feedback from the press 5, which enables the control unit 9 to evaluate the pressing process. For example, the press 5 reports actual values of the pressing force and the pressing travel to the control unit 9. The control unit can then calculate the product strength, which also reflects the degree of freezing of the pressed food product 1. This is advantageous because the pressing process is irreversible only at low product temperatures in the freezing range. When pressing warmer products, on the other hand, the product deformation largely recedes after pressing, which is undesirable. It therefore makes sense for the control unit 9 to generate an error message if the evaluation of the feedback from the press 5 shows that the food products 1 are too warm for a proper pressing process.

The pressed food product 2 is then conveyed from the press 5 to the scanner 6 by the conveyor 3 in a step S5.

In a step S7, the pressed food product is then scanned in the second scanner 6, determining appropriate analysis parameters, which are then forwarded to the control unit 9.

In a step S8, the pressed food product 2 is then conveyed from the scanner 6 to the cutting unit 7.

In a step S9 the pressed food product 2 is then cut into slices in the slicing device 7.

In the next step SW, the sliced food product 2 is then conveyed to the packaging machine 8 and finally packaged in a final step S11.

Figure 3A:
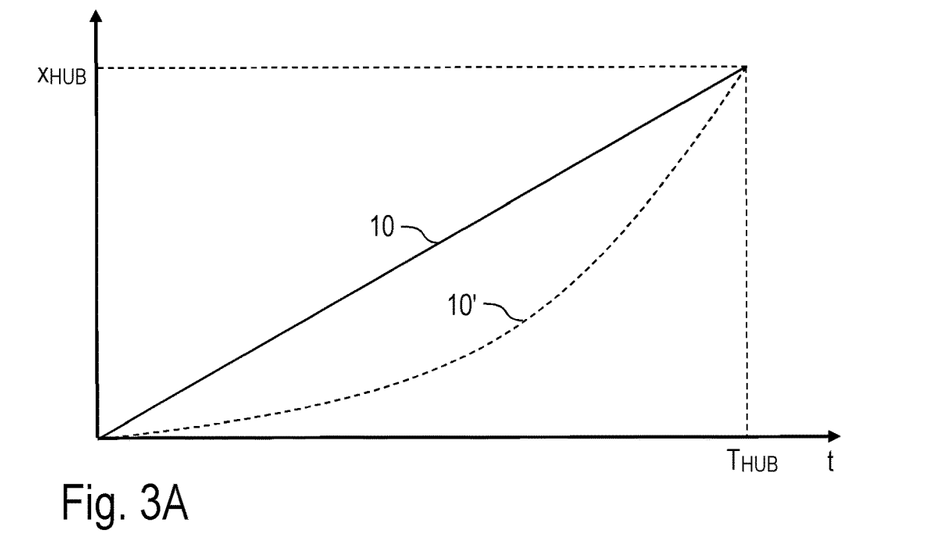
FIG. 3A shows different pressing travel-time curves.

The pressing parameters specified by the control unit 9 can also include a pressing travel-time curve of 10 or 10', as shown in FIG. 3A. In the case of pressing travel-time curve 10, the pressing travel x increases linearly with time until the maximum pressing travel $x_{HUB}$ is finally reached after the specified press duration $T_{HUB}$. The pressing travel x is the compression travel covered by the food product 1 during deformation.

In contrast, the pressing travel-time curve 10' differs from the pressing travel-time curve 10 by a progressive course, which can lead to an optimization of the pressing process.

Figure 3B:
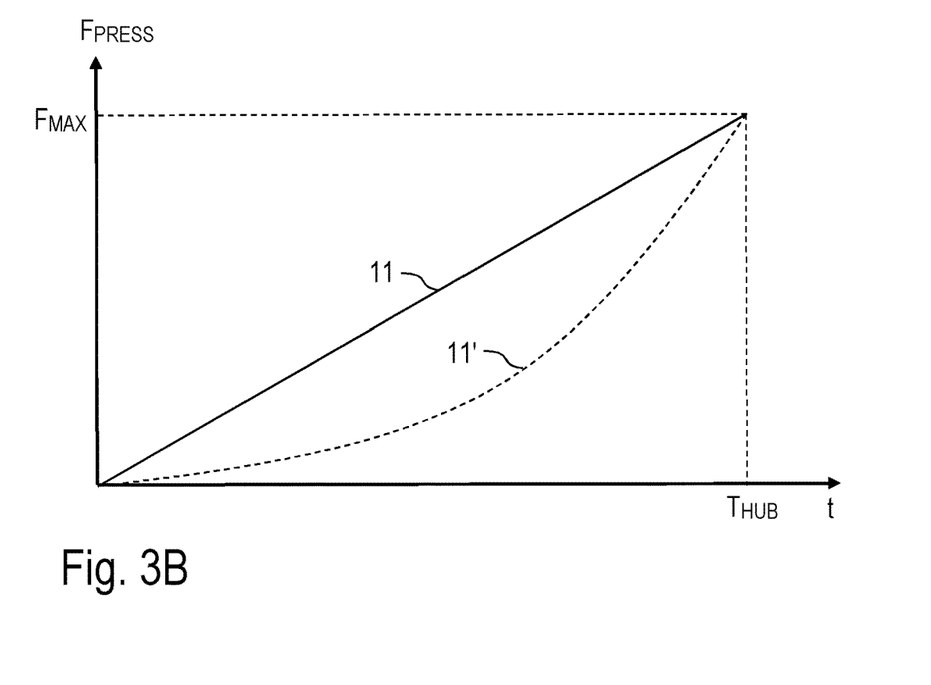
FIG. 3B shows various pressing force-time curves.

The pressing parameters specified by the control unit 9 may also include a pressing force-time curve 11 or 11', as shown in FIG. 3B.

With the pressing force-time curve 11, the pressing force $F_{PRESS}$ increases linearly with the time t during the $T_{HUB}$ press duration.

The pressing force-time curve 11', on the other hand, has a progressive curve, which can contribute to an optimization of the pressing process.

Figure 3C:
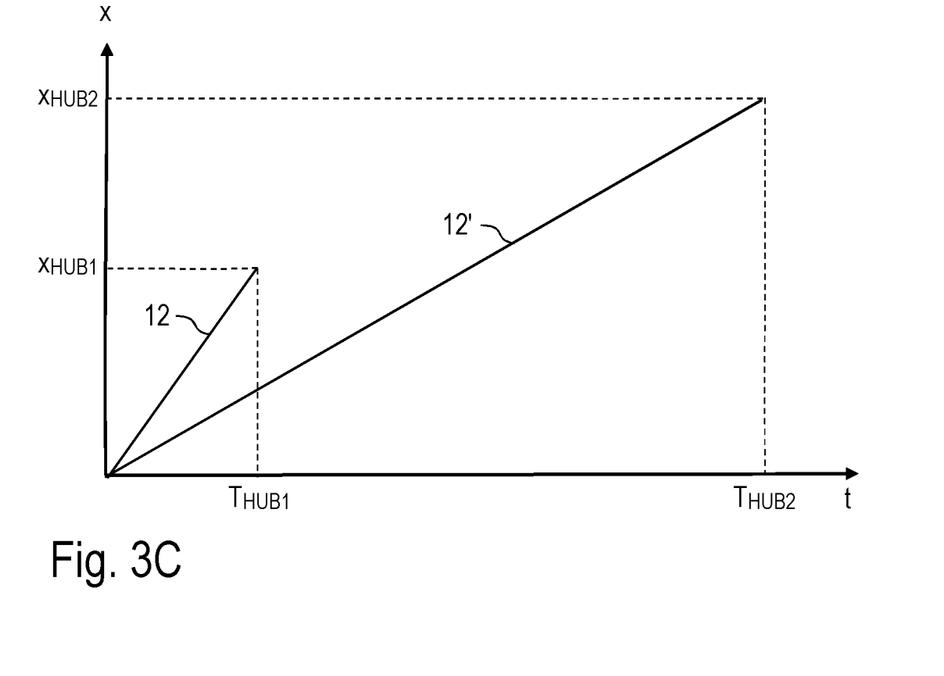
FIG. 3C shows different pressing travel-time curves for different degrees of deformation, FIG. 4A schematically shows the pressing of a relatively large product, so that the pressing chamber is opened relatively wide, and FIG. 4B schematically shows the pressing of a relatively small product, so that the pressing chamber is opened relatively little.

FIG. 3C finally shows two pressing travel-time curves 12, 12'.

With the pressing travel-time curve 12, the pressing process takes place within a short pressing time $T_{HUB1}$ with a relatively small pressing travel $x_{HUB1}$. This means that the degree of deformation is relatively low, so that pressing can be carried out relatively quickly without any risk of damage to the food product.

With the pressing travel-time curve 12', on the other hand, the degree of deformation is much greater, so that it is advantageous to press more slowly, i.e. with a much longer $T_{HUB2}$ press duration.

Figure 4A:
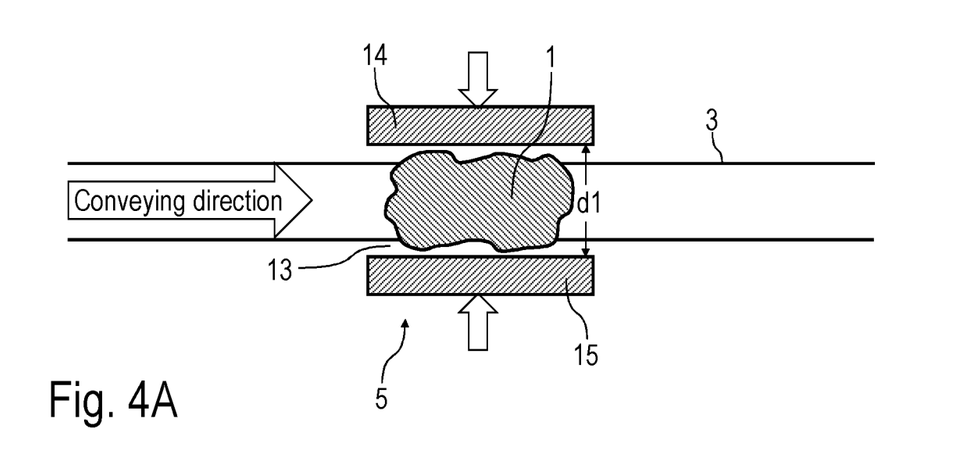
Figure 4B:
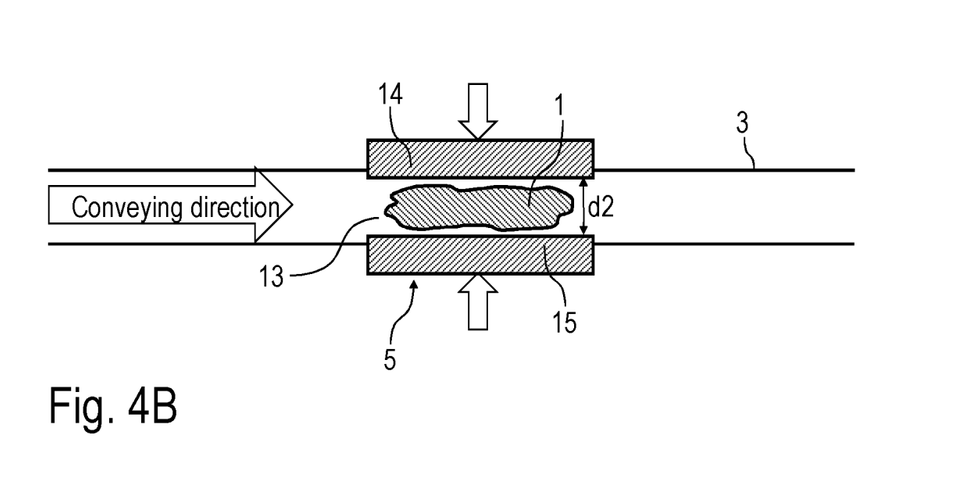

FIGS. 4A and 4B illustrate the pressing of products 1 of different sizes in the press 5 which comprises a pressing chamber 13 with an adjustable degree of opening d1, d2 and movable dies 14, 15 for pressing the product 1.

In FIG. 4A on the one hand, the product 1 to be pressed is relatively large. The size of the product 1 is determined by the scanner 5 and the control unit 9 controls the press 5 so that the pressing chamber 13 opens relatively wide for receiving the large product 1, i.e. the degree of opening d1 is relatively large.

In FIG. 4B on the other hand, the product 1 to be pressed is relatively small. The size of the product 1 is determined by the scanner 5 and the control unit 9 controls the press 5 so that the pressing chamber 13 opens relatively little for receiving the small product 1, i.e. the degree of opening d2 is relatively small.

Therefore, an unnecessary wide opening of the pressing chamber 13 is avoided and the press 5 is nevertheless suitable to receive products 1 of different sizes.

The invention is not limited to the preferred embodiment described above. Rather, the invention comprises various variants and modifications which also make use of the inventive idea and therefore fall within the scope of protection. In particular, the invention also claims protection for the subject-matter and the features of the dependent claims independently of the claims referred to in each case and in particular also without the features of the main claim. The invention thus comprises various invention aspects which enjoy protection independently of each other.

LIST OF REFERENCE SIGNS

1 Food product before pressing
2 Food product after pressing
3 Conveyor
4 Scanner before the press
5 Press
6 Scanner behind the press
7 Slicing device
8 Packaging machine
9 Control unit
10, 10' Pressing travel-time curve
11, 11' Pressing force-time curve
12, 12' Pressing travel-time curve
13 Pressing chamber
14, 15 Dies of the press d1, d2 Degree of opening of the pressing chamber
x Pressing travel
$x_{HUB}$ Pressing travel
$T_{HUB}$ pressing time
$F_{MAX}$ Maximum pressing force
t Pressing time

The invention claimed is:

1. A food processing apparatus for processing food products comprising:
   a press configured to press the food products according to predetermined pressing parameters;
   a first analyzing device configured to analyze the food products before pressing and configured to generate corresponding first analysis parameters of the food products, the first analysis parameters representing product properties of the analyzed food product; and
   a control unit having an output side connected to the press and which is configured to adjust the pressing parameters of the press, the control unit having an input side connected to the first analyzing device and configured to receive the first analysis parameters and to set the pressing parameters of the press as a function of the first analysis parameters and connected to the press, the control unit is configured to receive feedback from the press in the form of feedback pressing parameters, and the control unit is configured to calculate a product parameter which represents a degree of freezing of the pressed product based upon the feedback pressing parameters.

2. The food processing apparatus according to claim 1, wherein the control unit is configured to set at least one of the following pressing parameters:
   a) maximum pressing force in at least one pressing axis,
   b) pressing travel in at least one pressing axis,
   c) pressing time,
   d) pressing force-time curve which represents a course of a pressing force as a function of a pressing time in at least one pressing axis,
   e) pressing travel-time curve which represents a course of a pressing travel as a function of a pressing time in at least one pressing axis,
   f) overall behavior model of three pressing axes which are aligned transversely to one another, and
   g) massaging parameters for massaging the food products during pressing.

3. The food processing apparatus according to claim 2, wherein
   the control unit is configured to determine an actual shape of the food products from the first analysis parameters before pressing,
   the control unit is configured to determine from the determined actual shape of the food products before pressing and a predetermined desired target shape a required degree of deformation which is required in order to press the food product from the actual shape into the target shape,
   the control unit is configured to set at least one pressing parameter as a function of the required degree of deformation so that the food products with a large degree of deformation are deformed more gently than the food products with a small degree of deformation.

4. The food processing apparatus according to claim 1, further comprising
   a second analyzing device configured to analyze the food products after pressing and configured to generate corresponding second analysis parameters of the food products, the second analysis parameters representing product properties of the pressed food product, and wherein the control unit is connected on its input side to the second analyzing device and is configured to receive the second analysis parameters and is configured to set the pressing parameters as a function of the second analysis parameters.

5. The food processing apparatus according to claim 4, wherein the control unit is configured to use the second analysis parameters to analyze whether the pressed food product has been altered as desired or undesired by a preceding pressing operation, by
 a) a fragmentation of the food product, or
 b) a fracture of a bone in the food product, or
 c) a formation of a brow, or
 d) a shaping of product shape into corners, or
 e) shape accuracy according to a form set used in the press, or
 f) relaxation of the food product after pressing; and the control unit is configured to adapt the pressing parameters if the pressed food product has been altered in an undesired form by the preceding pressing operation.

6. The food processing apparatus according to claim 1, wherein the first analyzing device comprises a scanner configured to scan the food products and configured to determine at least one of the following product properties:
 a) length of the food product,
 b) width of the food product,
 c) height of the food product,
 d) volume of the food product,
 e) shape of the food product,
 f) fat content of the food product,
 g) bone content of the food product,
 h) lean meat content of the food product,
 i) bone volume of the food product,
 j) bone form of the food product,
 k) presence of a brow of the food product.

7. The food processing apparatus according to claim 1, wherein the first analyzing device comprises a temperature measuring device configured to measure a temperature of the food products as a product property.

8. The food processing apparatus according to claim 4, further comprising:
 a slicing device configured to slice the pressed food products;
 a packaging device configured to package the food products; and
 a conveying device configured to convey the food products along a conveying path successively through the first analyzing device, through the press, through the second analyzing device, through the slicing device and into the packaging device.

9. The food processing apparatus according to claim 8, wherein
 at least one of the slicing device and the packaging device is configured to transmit desired specifications for the food product properties to the control unit, and
 the control unit is configured to set the pressing parameters as a function of the desired specifications.

10. The food processing apparatus in accordance with claim 1, wherein
 the first analyzing device comprises a scanner and the first analysis parameters reflect a size of the incoming food products,
 the press comprises a pressing chamber in which the food products are pressed, wherein the pressing chamber can be opened with an adjustable degree of opening to receive one of the food products for subsequent pressing of the food product, and
 the control unit is configured to control the degree of opening of the pressing chamber according to the size of the food product as determined by the scanner, wherein the pressing chamber opens relatively wide for receiving a large food product, while the pressing chamber opens relatively little for receiving a small food product.

11. The food processing apparatus according to claim 4, wherein the control unit is configured to set at least one of the following pressing parameters:
 maximum pressing force in three pressing axes which are aligned transversely to a) one another,
 b) pressing travel in three pressing axes which are aligned transversely to one another,
 c) pressing time,
 d) pressing force-time curve which represents a course of a pressing force as a function of a pressing time in three pressing axes which are aligned transversely to one another,
 e) pressing travel-time curve which represents a course of a pressing travel as a function of a pressing time in three pressing axes which are aligned transversely to one another,
 f) overall behavior model of three pressing axes which are aligned transversely to one another, and
 g) massaging parameters for massaging the food products during pressing.

12. The food processing apparatus according in accordance with claim 3, wherein the one pressing parameter is at least one of a pressing duration and a pressing speed.

13. The food processing apparatus according to claim 4, wherein the first analyzing device and/or the second analyzing device comprises a scanner configured to scan the food products and configured to determine at least one of the following product properties:
 a) length of the food product,
 b) width of the food product,
 c) height of the food product,
 d) volume of the food product,
 e) shape of the food product,
 f) fat content of the food product,
 g) bone content of the food product,
 h) lean meat content of the food product,
 i) bone volume of the food product,
 j) bone form of the food product,
 k) presence of a brow of the food product.

14. The food processing apparatus according to claim 13, wherein the scanner is an optical scanner or an X-ray scanner.

15. The food processing apparatus according to claim 4, wherein the first analyzing device and/or the second analyzing device comprises a temperature measuring device configured to measure the temperature of the food products as a product property.

16. The food processing apparatus according to claim 5, wherein the scanner is an optical scanner or an X-ray scanner.

17. The food processing apparatus according to claim 9, wherein the desired specifications for the food product properties is a desired target shape of the food products.

* * * * *